July 17, 1951  J. LEIBOWITZ  2,561,125
COOKING DEVICE
Filed Aug. 10, 1945  2 Sheets-Sheet 1

INVENTOR
Joseph Leibowitz
BY
ATTORNEY

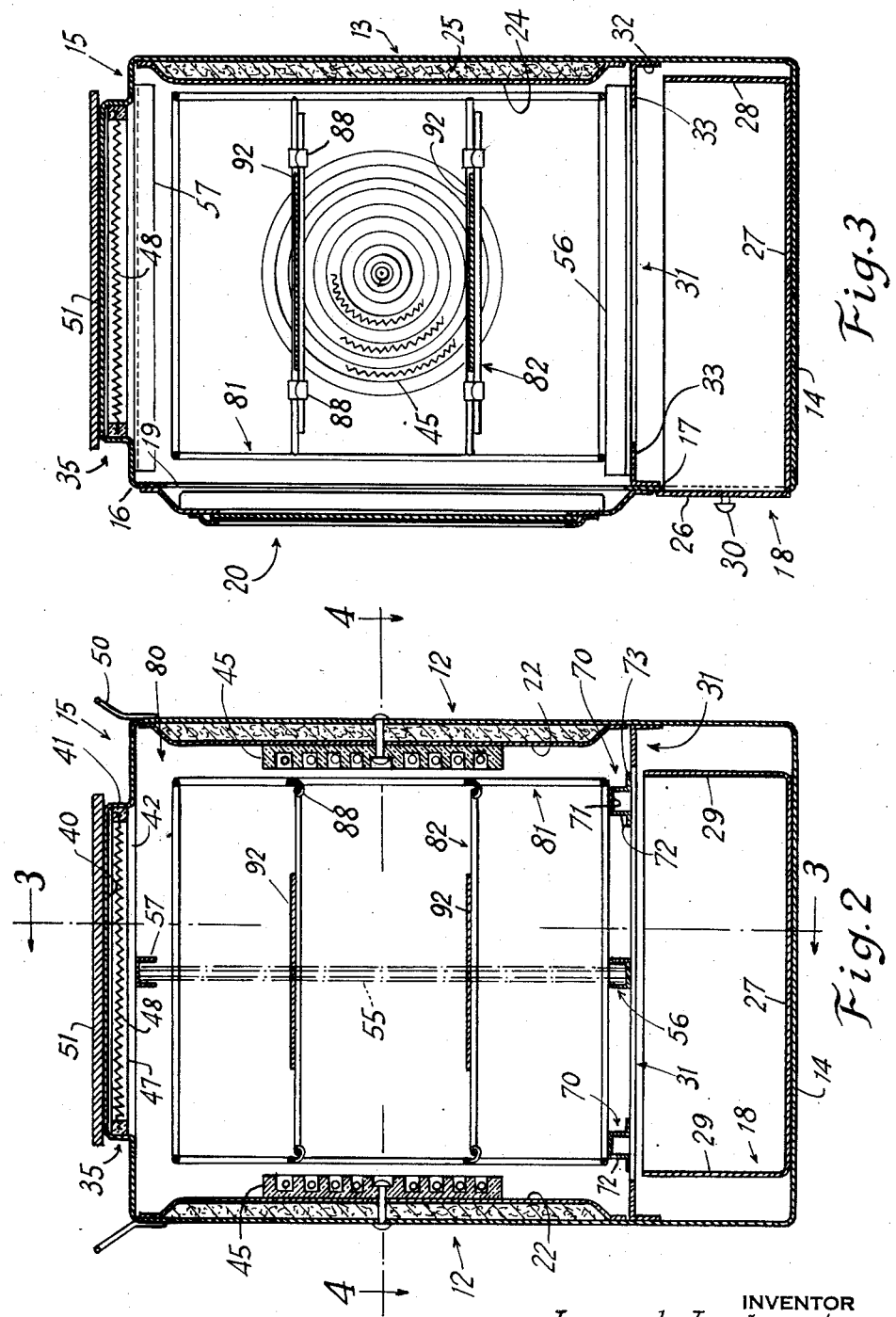

Patented July 17, 1951

2,561,125

UNITED STATES PATENT OFFICE 2,561,125

COOKING DEVICE

Joseph Leibowitz, Brooklyn, N. Y.

Application August 10, 1945, Serial No. 610,142

8 Claims. (Cl. 126—275)

This invention relates to cooking devices.

An object of this invention is to provide a cooking device comprising a casing provided with a front door and having heating elements at the inner surfaces of the side walls thereof, and being provided with top and bottom channels adapted to slidably support a hand grid, said door being provided with an opening through which the handle of the grid may project, and said opening having a closure for closing said opening when the grid is not used.

A further object of this invention is to provide a device of the character described comprising a casing having a front wall, and a frame removably mounted within the casing and provided with means to support food to be cooked, and the side walls of the casing being provided at their inner surfaces with heating means for cooking the food on said shelves.

Yet a further object of this invention is to provide a cooking device of the character described having a top wall, a heating element beneath the top wall, and a griddle plate on said top wall, whereby the heating element may be employed to heat the griddle as well as to aid in cooking food within the casing.

Still a further object of this invention is to provide a cooking device of the character described provided with a drawer at the bottom to catch the drippings.

Yet a further object of this invention is to provide a strong, durable and compact cooking device of the character described which shall be relatively inexpensive to manufacture, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings in which is shown one of the various possible illustrative embodiments of this invention.

Fig. 2 is an elevational cross-sectional view through the cooking device taken on a plane parallel to the front of said device;

Fig. 3 is a cross-sectional view taken on line 3—3 of Fig. 2;

Figure 1:
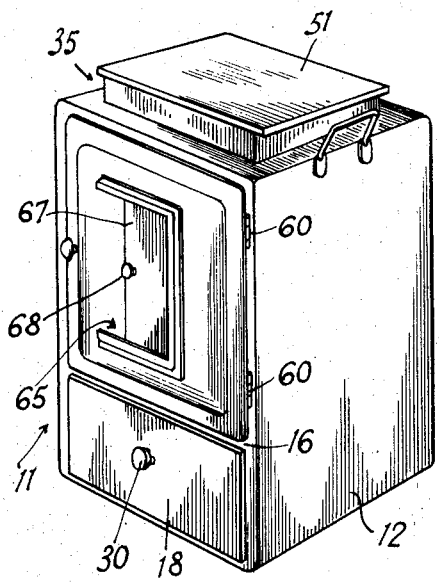
Fig. 1 is a perspective view of the cooking device embodying the invention.
Figure 5:
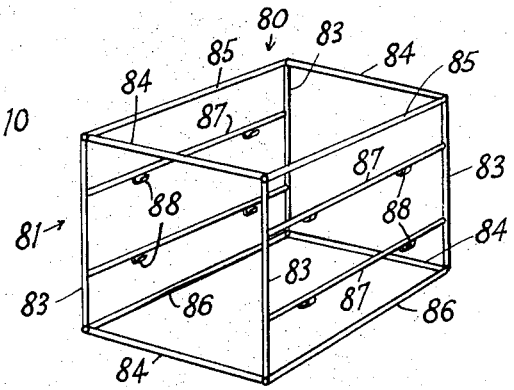
Fig. 5 is a perspective view of the removable frame for supporting shelves within the cooking device.
Figure 6:
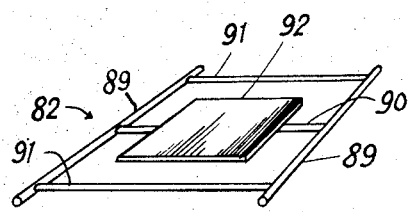
Fig. 6 is a perspective view of one of the shelves adapted to be mounted on the frame of Fig. 5.
Figure 4:
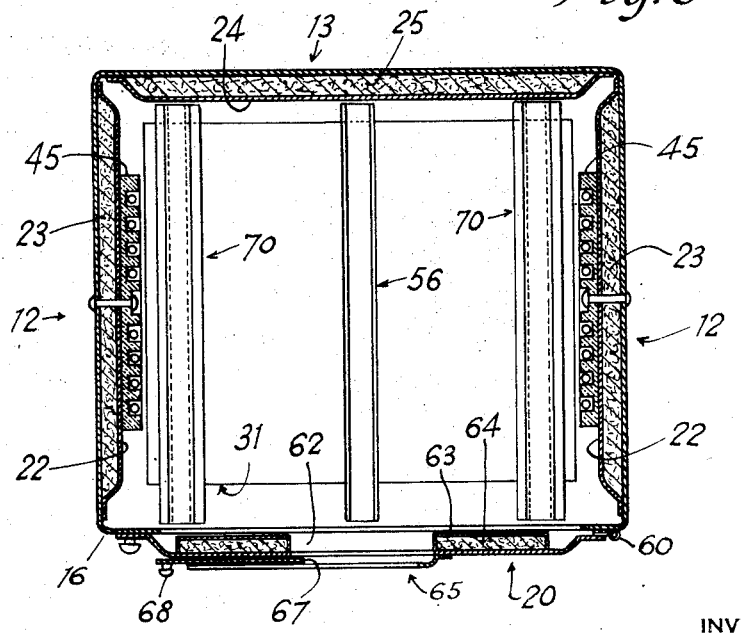
Fig. 4 is a cross-sectional view taken on line 4—4 of Fig. 2.

Referring now in detail to the drawing, 10 designates a cooking device embodying the invention. The same comprises a casing 11 having side walls 12, a rear wall 13, a bottom wall 14, and a top wall 15. The casing is provided with a front wall 16 formed with an opening 17 at the bottom for a drawer 18 fitted into the bottom of the casing, and also formed with a larger opening 19 at the top adapted to be closed by a door 20.

Attached to the inner surface of side walls 12 are inner walls 22 forming chambers therewith for heat resistant insulation 23. Attached to the inner surface of the rear wall 13 and spaced therefrom is an inner wall 24 forming therewith a chamber receiving heat resistant insulation 25. The outer edges of the inner walls 22 and 24 may be bent into contact with walls 12 and 13, respectively, and welded or otherwise fixed thereto.

The drawer 18 comprises a front wall 26, a bottom wall 27, a rear wall 28, and side walls 29. The side walls 29 of the drawer are spaced inwardly from side walls of the casing. The drawer is open at the top as shown in the drawing. The front wall of the drawer may be provided with a handle 30.

Within the casing and above the drawer 18 is a horizontal frame support or flange 31. The frame support or flange 31 is of angular transverse cross-section. It has downwardly extending flanges 32 at the front, rear and side thereof contacting front, rear and side walls, respectively, of the casing, and welded or otherwise fixed thereto. Extending inwardly from the flanges 32 are horizontal flanges 33 at the front, rear and sides. The support 31 is located just beneath the door opening 19.

The top wall 15 of the casing is provided with a central raised flat dome portion 35 including a top horizontal wall 40 and front, rear and side walls 41 spaced inwardly from the front, rear and side walls, respectively, of the casing. A dome portion 35 thus forms a dome chamber 42 for a purpose hereinafter appearing.

Fixed to the inner surfaces of side walls 22 are electric heating elements 45. Such elements may be of any suitable type for example of the type which includes a block of heat resistant electric insulating material formed with grooves in which are received coil resistance wires.

Within the dome chamber 42 is an insulating frame 47 to which are connected electric resistance coils 48 thus providing a heating device at the top of the casing.

Attached to the upper ends of the side walls 12 are upwardly and outwardly inclined handles 50. Mounted on the top wall 40 of the dome 35 is a griddle plate 51.

Means is provided to removably support a hand grid 55 in vertical position within the casing between the heating elements 45. To this end there is mounted on the support 31, a channel member 56 extending from front to rear. The front end of the channel member contacts the front flange portion 33 whereas the rear of the channel contacts the rear flange portion 33. Channel portion 56 may be welded or otherwise fixed to said flanges. Said channel is open at the top as shown in Fig. 2 of the drawing.

Fixed to the underside of the top wall 15 is a complementary channel 57 aligned with and disposed above channel 56. The front and rear ends of channel 57 contact the front and rear portions of top wall 15 and is welded or otherwise fixed thereto. Channel 57 opens downwardly in opposed relation to channel 56. The grid 55 may be inserted into the casing in a vertical plane by engaging the side edges of the grid within the channels 56, 57. The handle of the grid will thus project through the front of the casing. The grid 55 will thus be located centrally between the heating elements 45.

A steak or other food in the grid will thus be broiled by said heating elements. It will also be heated by the top heating element 48 if desired. Any suitable electrical connections may be provided for the heating elements. Thus for example, the heating elements 45 may be connected in series circuit with each other. The heating element 48 may be so connected that it may be energized simultaneously with the elements 45, or separately.

The front door 20 is hinged at one side as at 60 to the front wall 16. The front door 20 is formed with a central rectangular opening 62. Attached to the inner side of the wall 20 and surrounding the opening 62 is an inner wall 63 forming a chamber with the outer wall for insulation 64.

Attached to the outside of wall 20 is a guide 65 having top, bottom and end portions. Slidably mounted on the guide and between the top and bottom portions thereof is a panel 67 provided with a handle 68. The panel 67 is adapted, in one position thereof, to uncover the opening 62 in the door so as to permit the handle of the grid to project through said opening. When the grid is not in use, the panel 67 may be moved to a position for closing the opening 62.

It will now be understood that the top heating element 48 will heat the griddle plate 51 so that griddle cakes may be made on said plate or other food cooked thereon. The cooking device may thus be used for broiling on grid 55, or for cooking on the griddle 51.

The device however may also be used for baking when the grid 55 is removed. To this end there is mounted on the support 31 a pair of parallel rails 70 extending from front to rear and located on opposite sides of channel 56. The front ends of rails 70 lie on the front flange portions 33, whereas the rear ends of said members lie on the rear flange portions. Rails 70 may be welded or otherwise secured to the flanges 33. Each rail 70 may be made of sheet metal and comprises a top wall 71, parallel side walls 72 extending outwardly therefrom, and flanges 73 extending outwardly from said parallel walls. The top surfaces of rails 70 are preferably located at a somewhat higher level than the channel 56.

Removably mounted on rails 70 is a frame 81 supporting a plurality of shelves 82. Frame 81 may be made of wire stock and comprises front and rear aligned rectangles, each comprising parallel vertical rods 83 and top and bottom horizontal rods 84. Said rectangles are interconnected by top parallel rods 85 and bottom parallel rods 86. The rods 83 at each side of the frame are interconnected by a pair of parallel rods 87 extending from front to rear. On each of rods 87 is a pair of inwardly extending hooks 88.

Each shelf 82 comprises a pair of parallel side rods 89 extending from front to rear. Rods 89 are interconnected by a centrally located rod 90 extending from side to side and front to rear parallel rods 91. On rod 90 is a substantially square plate 92 welded or otherwise fixed thereto.

It will be noted that all the rods or wires comprising members 81 and 82 are assembled by welding or in any other suitable manner. The shelves 82 may be mounted on the hooks 88. Thus two shelves are supplied for the device 81. Each shelf is mounted on a pair of aligned parallel side rods 87. The device 81 removably fits into the casing and is supported on members 70. Pots or other vessels containing food may be placed on the shelves 82 for baking by the heating elements 45 and 48.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. A cooking device of the character described comprising a casing having side walls, a rear wall, a bottom wall, a top wall, and a front wall, the front wall being provided with an opening, a door hinged to said front wall to close said opening, heating elements at the inner sides of the side walls of the casing, a drawer at the bottom of the casing, a support within the casing above the drawer and below said door, a channel extending from front to rear on said support opening upwardly, and a channel attached to the underside of the top wall and extending from front to rear and opening downwardly in opposed relation to said first mentioned channel, said channels being disposed between said heating elements and forming means for supporting a vertically disposed, removable hand grid between said heating elements and above said drawer.

2. A cooking device of the character described comprising a casing having side walls, a rear wall, a bottom wall, a top wall, and a front wall, the front wall being provided with an opening, a door hinged to said front wall to close said opening, heating elements at the inner sides of the side walls of the casing, a drawer at the bottom of the casing, a support within the casing above the drawer and below said door, a channel extending from front to rear on said support opening upwardly, a channel attached to the underside of the top wall and extending from front to rear and opening downwardly in opposed relation to said first mentioned channel, and a heating element beneath said top wall, said heating element being interposed between the top channel and said top wall said channels forming means for supporting a vertically disposed, removable hand grid between the heating elements on said side walls and below the heating element beneath said top wall.

3. A cooking device of the character described comprising a casing having side walls, a rear wall, a bottom wall, a top wall, and a front wall, the front wall being provided with an opening, a door hinged to said front wall to close said opening, heating elements at the inner sides of the side walls of the casing, a support within the casing and below said door, a channel member U-shaped in cross-section extending from front to rear on said support, a channel member of inverted U-shape in cross-section attached to the underside of the top wall and extending from front to rear said channels adapted to support a vertically disposed removable hand grid between said heating elements and above said support, a heating element beneath said top wall, said heating element being interposed between the top channel and said top wall, and a griddle plate on top of said top wall said last mentioned heating element being adapted to supply heat to said plate and to the interior of said casing.

4. A cooking device of the character described comprising a casing having side walls, a rear wall, a bottom wall, a top wall, and a front wall, the front wall being provided with an opening, a door hinged to said front wall to close said opening, heating elements at the inner sides of the side walls of the casing, a drawer at the bottom of the casing, a support within the casing above the drawer and below said door, a channel extending from front to rear on said support opening upwardly, a channel attached to the underside of the top wall and extending from front to rear and opening downwardly, a heating element beneath said top wall, said heating element being interposed between the top channel and said top wall, said door being provided with an opening, and a sliding panel to close said opening in the door said channels being adapted to support a vertically disposed removable handled grid between the heating elements on said side walls, said sliding panel in one position allowing the handle of said grid to project outwardly of said casing.

5. A cooking device comprising a casing having side walls, heating elements at the inner sides of said side walls, said casing being provided with a door at the front, means within the casing to slidably support opposite edges of a handled grid in vertical position, said door being provided with an opening through which the handle of the grid may project, said casing having a top wall, a heating element beneath said top wall, and a griddle plate on the top of said top wall and above said last-mentioned heating element.

6. A cooking device comprising a casing having side walls, heating elements at the inner sides of said side walls, said casing being provided with a door at the front, means within the casing to slidably support opposite edges of a handled grid in vertical position, said casing having a top wall, a heating element beneath said top wall, a griddle plate on the top of said top wall and above said last-mentioned heating element.

7. A cooking device comprising a casing having side walls, a top wall and a bottom wall, heating elements on each of said side walls and beneath said top wall, a support above said bottom wall, a channel on said support opening upwardly, a channel beneath the heating element on said top wall opening downwardly, and in opposed relation to said first mentioned channel, said channels being disposed between the heating elements on said side walls, a pair of rails on said support, said rails being disposed on either side of said first mentioned channel, the upper surface of said rails being at a higher level than the upper edges of said channel, said channels being adapted to support the opposite edges of a vertically disposed removable handled grid and said rails being adapted to support a food supporting rack when said grid is not in use.

8. A cooking device comprising a casing having side walls, a top wall and a bottom wall, heating elements on each of said side walls and beneath said top wall, a support above said bottom wall, a channel on said support opening upwardly, a channel beneath the heating element on said top wall opening downwardly, and in opposed relation to said first mentioned channel, said channels being disposed between the heating elements on said side walls, said channels being adapted to support the opposite edges of a vertically disposed removable handled grid.

JOSEPH LEIBOWITZ.

REFERENCES CITED

The following references are of record in the file of this patent:

UNITED STATES PATENTS

| Number | Name | Date |
|---|---|---|
| 112,846 | Phelps et al. | Mar. 21, 1871 |
| 716,365 | Bayno | Dec. 23, 1902 |
| 903,834 | Boeddener | Nov. 17, 1908 |
| 1,076,731 | Woodrow | Oct. 28, 1913 |
| 1,255,771 | Miller | Feb. 5, 1918 |
| 1,582,532 | Owen | Apr. 27, 1926 |
| 1,587,023 | Mottlau | June 1, 1926 |
| 1,706,264 | Thomas | Mar. 19, 1929 |
| 1,784,753 | Rogers | Dec. 9, 1930 |
| 1,855,123 | Antrim | Apr. 19, 1932 |
| 1,989,275 | Hatch | Jan. 29, 1935 |
| 2,101,967 | Walterspiel | Dec. 14, 1937 |
| 2,151,105 | Hendershot et al. | Mar. 21, 1939 |
| 2,234,596 | Heilman | Mar. 11, 1941 |
| 2,257,159 | Crites | Sept. 30, 1941 |
| 2,269,480 | Rehm | Jan. 13, 1942 |
| 2,300,405 | Cook | Nov. 3, 1942 |
| 2,314,772 | Corra | Mar. 23, 1943 |
| 2,375,913 | Gilbert | May 15, 1945 |